United States Patent [19]

Neeser et al.

[11] Patent Number: 5,695,844
[45] Date of Patent: Dec. 9, 1997

[54] VACUUM INSULATION PANEL WITH IMPROVED BRAZE SEAL-OFF AND METHOD FOR MANUFACTURING SAME

[75] Inventors: Timothy Neeser, Savage; Bruce Lyman, Northfield, both of Minn.

[73] Assignee: MVE, Inc., New Prague, Minn.

[21] Appl. No.: 584,778

[22] Filed: Jan. 11, 1996

[51] Int. Cl.⁶ .............. B32B 1/06; B32B 15/04; B32D 15/16
[52] U.S. Cl. ............... 428/69; 428/70; 428/72; 428/920; 428/62; 52/785
[58] Field of Search .................. 428/69, 70, 72, 428/920, 621; 52/785

[56] References Cited

U.S. PATENT DOCUMENTS 5,550,305  8/1996  Bridges et al. .................. 428/621

Primary Examiner—Richard Weisberger
Attorney, Agent, or Firm—Rudnick & Wolfe

[57] ABSTRACT

In the manufacture of vacuum insulation panels, it is necessary to prevent deformation and damage to the brazed seal-off provided to maintain internal vacuum. The invention provides seal-off port geometries which improve the integrity of the vacuum panel. Annular troughs are formed in the metal sheet around the seal-off port to provide improved strength and stability to the seal-off area and to permit movement to compensate for melt-back of the glass mat contained within the panel.

15 Claims, 3 Drawing Sheets

VACUUM INSULATION PANEL WITH IMPROVED BRAZE SEAL-OFF AND METHOD FOR MANUFACTURING SAME

BACKGROUND OF THE INVENTION

The invention relates generally to vacuum insulation panels and methods for their manufacturer. More particularly, the invention relates to an improved braze seal-off area and evacuation port for a vacuum insulation panel and a method of manufacturing the same.

Vacuum insulation panels are now in widespread use in thermal insulation applications including refrigerators, ovens and cryogenic storage tanks. These panels are extremely efficient at insulating against heat transmission. The insulating efficiency of the panels depends in part on the degree of evacuation achieved on the panel interior during manufacture and on the ability of the panel to maintain the internal vacuum throughout its useful life.

Conventional vacuum panels are typically formed from a flat sheet and a pan-shaped jacket member joined together at their edges to form an interior cavity. The jacket members are preferably formed from sheet metal, which provides an excellent barrier to gases that would migrate into the interior vacuum cavity during the life of the panel. Stainless steel is often utilized because it is non-permeable, has good corrosion resistance and a relatively low thermal conductivity compared with other metals. Insulating material, usually a compressed glass fiber mat, may be provided in the panel interior to improve the insulating characteristics and to support the panel walls against the forces of atmospheric pressure.

During manufacture, the entire panel is contained in a vacuum heating oven, where the temperature is elevated and controlled to ensure out-gassing, or release of residual gas contained in the insulating and barrier materials. To permit evacuation of the panel, a seal-off port is provided through one of the jacket members. Prior to the panel being introduced into the vacuum chamber, braze material is affixed to the jacket in the vicinity of the seal-off port so as not to block the port opening. At an appropriate time while the vacuum is applied, the braze is melted by local radiant heat from a heating tool contained in the vacuum chamber. Molten braze then flows into the seal off port and hardens when the heating tool is removed, thereby sealing the vacuum panel.

It is known to provide seal-off ports in the shape of elongate slits to permit molten braze to be retained by surface tension. Moreover, it is known to provide a dimple or reservoir to contain the molten braze. For example, U.S. Pat. No. 5,135,977 to Toida, et al. discloses various geometries for a sealing port on a double-walled insulating metal container. The seal-off takes the form of a series of holes or slits. A spherical depression contains the molten braze material and ensures its migration toward the seal-off port. Prior art seal-off ports, however, do not adequately address particular problems that occur in the manufacture of vacuum insulation panels. This is due in part to the unique structural characteristics and the behavior of the vacuum panels during the manufacturing process.

One problem in the manufacture of vacuum panels arises from the tendency for the metal jackets to warp or wrinkle during the manufacturing process due to thermal expansion of the very thin sheet metal. Warping or wrinkling of the jacket may occur in the vicinity of the seal-off port, causing irregularities in the seal-off geometry, poor quality of the braze seal and ultimately unreliability in the vacuum panel to function as an insulator. As the braze material is relatively brittle, it is susceptible to cracking in the presence of residual stresses that may develop because of irregularities which develop on the panel surface.

Another problem specific to the manufacture of thermal insulation panels is that of a degree of melt-back in the glass insulating material inside the panel. The high temperature required to melt the braze material during the sealing operation may melt and shrink a portion of the glass mat which is adjacent to the seal off port. Thus, melt-back produces a void between the panel jacket and the glass mat. Since the glass mat functions to provide support to the panel walls against atmospheric pressure, this void represents an unsupported area of the panel wall which may become deformed.

Yet another problem in the manufacture of vacuum insulation panels results from misalignment of the local heating tool with the seal-off area during the sealing operation. Typically, positioning of the heating tool is based on the panel dimensions, which often change enough during panel heating that the heating tool may not be precisely aligned with the seal-off port. A non-uniform seal may result. There is thus a need for a vacuum panel and a manufacturing method therefor which solve the aforementioned problems.

SUMMARY OF THE INVENTION

The present invention solves the problems and concerns of the prior art by providing a braze seal-off area for a vacuum insulation panel which includes one or more annular ring-shaped depressions or isolation troughs in the metal jacket formed around the evacuation port. The rings isolate and strengthen the seal-off port with respect to the remaining surface of the panel and prevent the port from being affected by jacket warping or wrinkling. The problems associated with melt-back are alleviated because a series of concentric depressions around the seal-off enable the seal-off port area to move resiliently with respect to the jacket surface. The seal-off area may thus seat against the melted back portion of the glass fiber mat within the panel to eliminate the void that would otherwise exist. Additional depressions also provide a means for alignment of the heating tool used in automated production ensure accurate alignment and quality sealing of each panel.

DESCRIPTION OF THE PREFERRED EMBODIMENTS OF THE INVENTION

Figure 1:
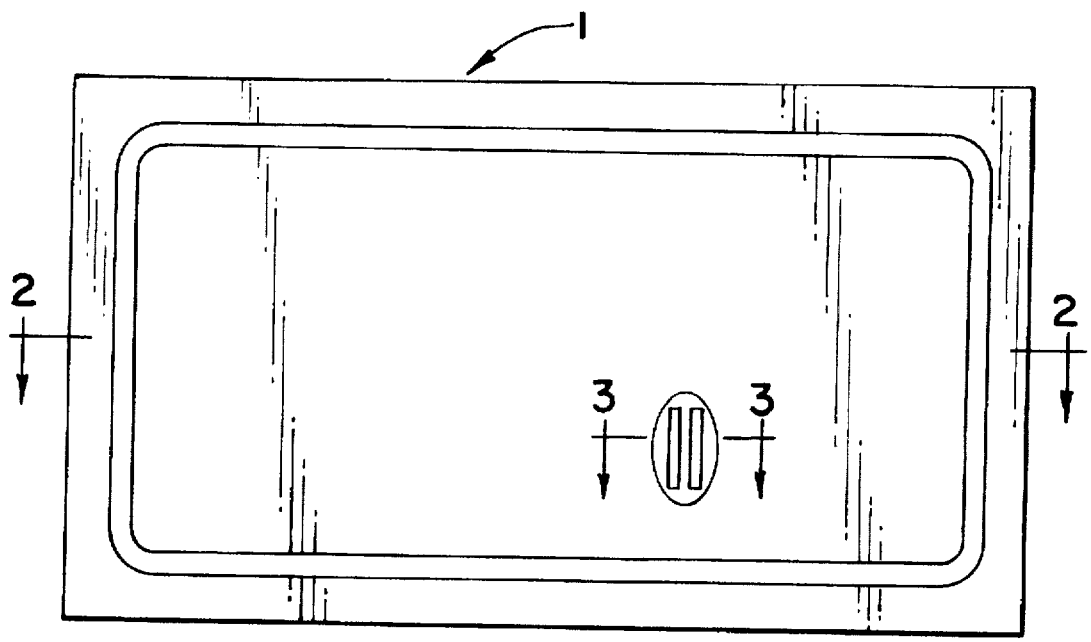
FIG. 1 is a vacuum panel of the prior art including a known configuration for the braze seal-off port.
Figure 2:
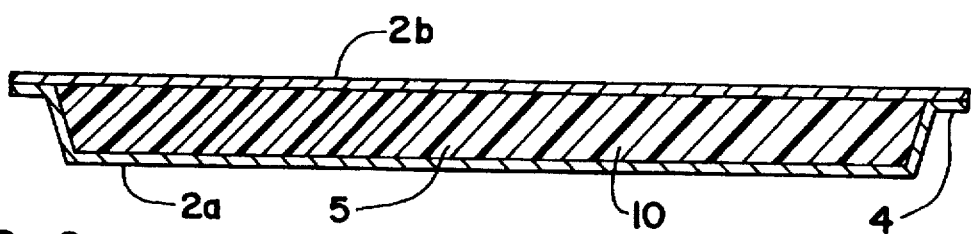
FIG. 2 is a cross-section taken along lines 2—2 of FIG. 1.
Figure 3:
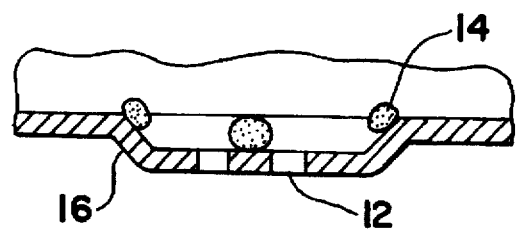
FIG. 3 is a cross-section taken along line 3—3 of FIG. 1.

FIGS. 1–3 depict a known vacuum panel 1, which comprises metal jacket 2 including bottom 2A and a top 2B.

Bottom 2A is formed into a pan shape to define a cavity 5 for receiving the insulating medium 10 therein. Flange 4 extends about the periphery of the bottom 2B. Flange 4 facilitates the formation of a hermetic seal with top sheet 2B which may be flat or pan shaped or have any appropriate configuration. Insulating medium 10 typically consists of a dense-packed glass wool with a density in the range of 9.0 to 20.0 pounds per cubic foot and provides support to the interior of vacuum panel to oppose atmospheric pressure forces which tend to collapse top 2B and bottom 2A inward towards one another. FIG. 3 depicts a cross-section of a prior art seal-off with slots 12 and braze material 14. Braze 14 is shown in its solid state prior to sealing. Molten braze migrates to the bottom of depression 16 and is drawn into slots 12 by surface tension and gravity.

Figure 4:
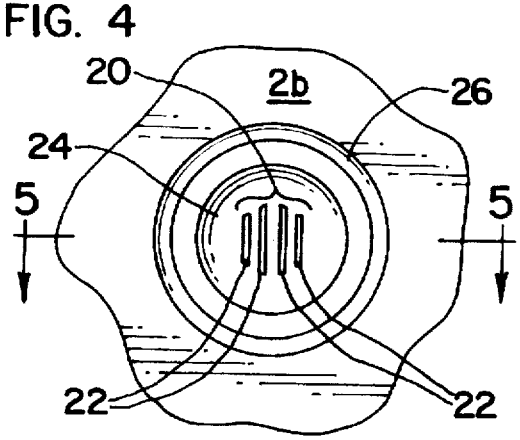
FIG. 4 illustrates one embodiment of the present invention which incorporates a single annular depression.
Figure 6:
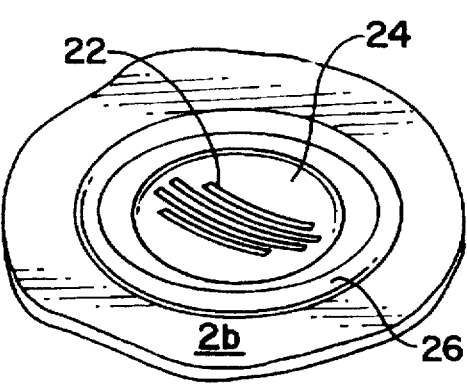
FIG. 6 is an isometric view of the embodiment of FIGS. 4 and 5.
Figure 5:
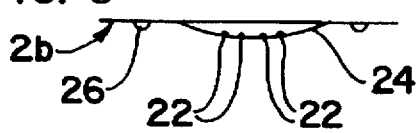
FIG. 5 is a cross-section taken along line 5—5 of FIG. 4.

FIGS. 4–6 illustrate one embodiment of the present invention. Port 20 is provided with a series of elongate apertures 22 which are disposed in the extreme lower portion of the depressed reservoir 24. The inner most apertures are longer than those displaced outward from the center of reservoir 24. The dimensions and geometry of the elongate apertures 22 minimize the time required to evacuate the interior of the panel while permitting distribution of the molten braze by surface tension forces to seal off the apertures. An aperture total area of approximately 0.050 square inches and a slot width of approximately 0.032 inches is preferred. Concentrically disposed about the periphery of the spherical depression 24 is an annular isolation trough 26. Isolation trough 26 is formed as a semi-circular depression in the metal sheet 2 as shown in the cross-section of FIG. 8. It is to be understood that isolation trough may have other cross-sectional shapes. Preferably, the outer isolation trough 26 is provided with a diameter of approximately 1.7 inches. Spherical depression 24 is preferably provided with a radius of a approximately 1.2 inches. Annular isolation trough 26 isolates seal-off port 20 from the rest of sheet 2 and provides strength and stability to the seal-off port area. Isolation trough 26 also acts as a barrier to the propagation of wrinkles to the seal-off port area 20 and to reduce brittle braze cracks or tears due to high local stresses caused by wrinkles.

Figure 7:
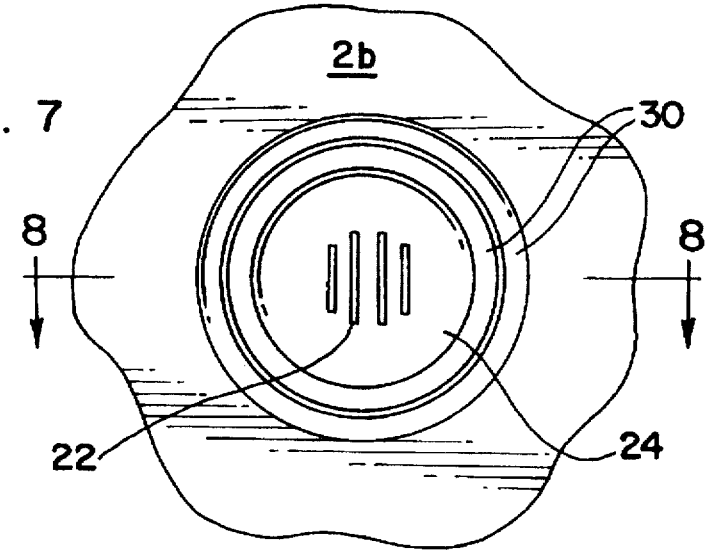
FIG. 7 illustrates an alternative embodiment of the present invention which incorporates series of concentric annular depressions.
Figure 8:
FIG. 8 is a cross-section taken along line 8—8 of FIG. 7.

FIGS. 7 and 8 illustrate another embodiment of the invention. A series of concentric rings 30 are provided around apertures 22 and spherical reservoir 24. Rings 30 are preferably located adjacent the edge of reservoir 24. The rings permit the movement of the reservoir 24 with respect to the plane of the metal sheet 2 in the direction of arrow A to compensate for the melted-back area of blocking material 5 (FIG. 2). Although only 2 convolute rings are illustrated it is to be understood that any number of rings may be provided in order to facilitate a given degree of travel of the reservoir 24 with respect to the sheet 2.

Figure 9:
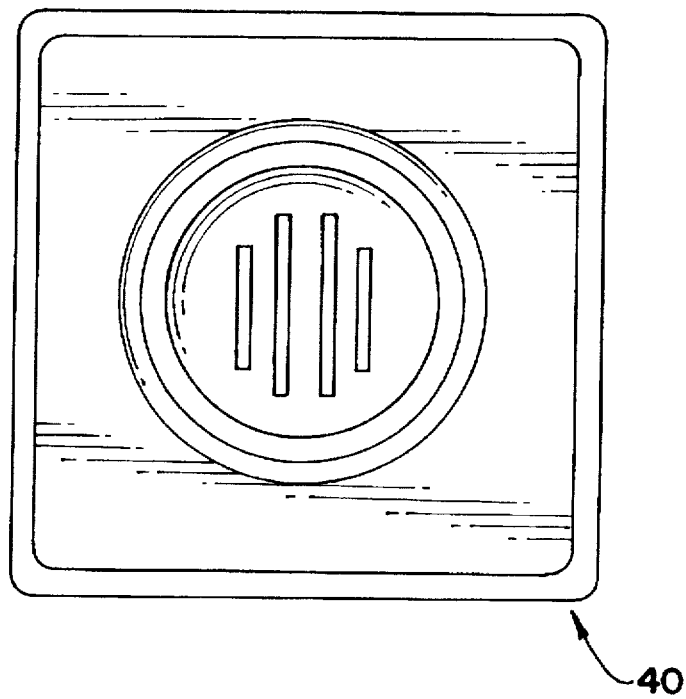
FIGS. 9 and 10 illustrate a heater alignment trough according to a preferred embodiment of the invention.
Figure 10:
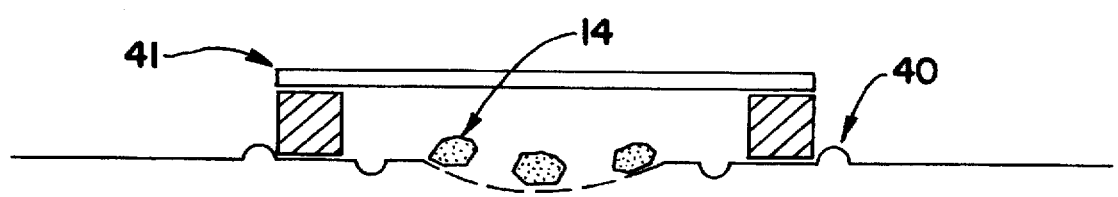

FIGS. 9 and 10 illustrate another embodiment of the invention. A raised alignment trough 40 in the metal sheet 2 is shown in a square or rectangular shape. This shape need not be entirely rectangular, but may incorporate partial linear troughs as needed for heater alignment. Trough 40 provides a means for alignment of local heater assembly 41. Alignment is critical to provide for the application of heat only where it is necessary to melt the braze 14.

As will be apparent to those of ordinary skill, the seal-off port of the present invention may be manufactured using known match metal die-stamping techniques. Preferably, reservoir 24, apertures 20, isolation trough 26, convolute rings and alignment trough 40 may be formed in a single die operation.

There has thus been described an improved braze seal-off area for a vacuum insulating panel which solves the prior art problems of the propagation of rips or tears in the metal jacket during manufacturing, and the glass melt back and associated wrinkles that occur in the metal jacket as a result thereof. It is to be understood that while the preferred embodiments have been described in some detail with respect to the drawings numerous changes in the construction in details of the braze seal-off area can be made without departing from the spirit and scope of the invention as set forth in the appended claims.

What is claimed is:

1. A thermal insulating panel comprising:
   a) a sealed metal jacket defining an interior cavity for maintaining a vacuum therein;
   b) a seal-off port including at least one evacuation aperture formed in the jacket and communicating with the interior cavity for permitting evacuation thereof; and
   c) a trough formed in the jacket and surrounding the seal-off port for isolating the seal-off port from irregularities that may occur in the jacket surface.

2. The insulating panel of claim 1, wherein the seal-off port is disposed in a reservoir formed in the jacket for containing molten braze.

3. The insulating panel of claim 1, wherein the evacuation apertures comprise elongate slits.

4. The insulating panel of claim 1, wherein the trough is ring-shaped.

5. The insulating panel of claim 2, wherein the reservoir is spherical and the trough is concentrically disposed about the reservoir.

6. The insulating panel of claim 2, further comprising at least one additional trough formed in the jacket and surrounding the reservoir, said troughs permitting the seal-off port to move towards the panel interior to compensate for melt-back of insulating media within the panel interior.

7. The insulating panel of claim 6, wherein the seal-off port is disposed in a reservoir, formed in the jacket, for containing molten braze.

8. The insulating panel of claim 6, wherein the evacuation apertures comprise elongate slits.

9. The insulating panel of claim 6, wherein the troughs are ring-shaped.

10. The insulating panel of claim 7, wherein the reservoir is spherical and the trough is concentrically disposed about the reservoir.

11. The insulating panel of claim 1, further comprising an alignment trough formed in the panel to facilitate alignment of a braze heating tool with the seal-off port.

12. A method of manufacturing a vacuum insulation panel comprising the steps of:
   a) providing a pair of jacket members;
   b) providing one of the jacket members with a seal-off port;
   c) forming a trough in the one jacket member, the trough surrounding the seal-off port; and
   d) joining the jacket members together to form a vacuum panel having an interior cavity.

13. The method of claim 12, further comprising the step of forming at least one additional depression in the one jacket member before joining the jacket members.

14. The method of claim 12, further comprising the steps of providing braze material adjacent the seal-off port and melting the braze to cause sealing of the seal-off port.

15. The method of claim 14, wherein the steps of melting the braze is performed in a vacuum chamber.

* * * * *